United States Patent [19]

Takamiya et al.

[11] Patent Number: 4,541,648
[45] Date of Patent: Sep. 17, 1985

[54] BICYCLE FRAME

[75] Inventors: Kikuzo Takamiya, Kitamoto; Hiroshi Todoroki, Ageo, both of Japan

[73] Assignee: Bridgestone Cycle Co., Ltd., Tokyo, Japan

[21] Appl. No.: 482,965

[22] Filed: Aug. 8, 1983

[30] Foreign Application Priority Data

Apr. 8, 1982 [JP] Japan .................................. 57-57346
Apr. 9, 1982 [JP] Japan ............................ 57-50574[U]

[51] Int. Cl.⁴ ........................................... B62K 19/00
[52] U.S. Cl. ................................ 280/281 R; 29/421 R
[58] Field of Search ................... 280/281 R, 282, 284; 72/57, 58; 219/106, 107; 285/156, 286; D12/110, 111; 29/421 R

[56] References Cited

U.S. PATENT DOCUMENTS

| 1,914,811 | 6/1933 | Kraeft | 219/107 |
| 2,183,563 | 12/1939 | Hart | 219/107 X |
| 2,353,712 | 7/1944 | Dewey | 280/281 R |
| 3,030,124 | 4/1962 | Holloway | 280/281 R |
| 4,051,704 | 10/1977 | Kimura | 72/58 |
| 4,484,756 | 11/1984 | Takamiya et al. | 280/281 R |

FOREIGN PATENT DOCUMENTS

| 472352 | 3/1951 | Canada | 72/57 |
| EP78551 | 5/1983 | European Pat. Off. | 280/281 R |
| EP91655 | 10/1983 | European Pat. Off. | 280/281 R |
| 1018329 | 10/1957 | Fed. Rep. of Germany | 280/281 R |
| 136245 | 10/1981 | Japan . | |
| 136246 | 10/1981 | Japan . | |
| 100313 | 12/1961 | Netherlands | 280/281 R |
| 296539 | 9/1928 | United Kingdom | 280/281 R |
| 639709 | 7/1950 | United Kingdom | 280/281 R |

Primary Examiner—Joseph F. Peters, Jr.
Assistant Examiner—Mitchell J. Hill
Attorney, Agent, or Firm—Stevens, Davis, Miller & Mosher

[57] ABSTRACT

A bicycle frame comprises a main frame having a head tube portion and a seat tube support portion integrally formed of a single blank tube, a seat tube inserted in the seat tube support portion of the main frame and having a cross-shaped lower end formed from a single blank tube by bulge-forming, a metal fitting having an aperture adapted to receive a lower end of the seat tube and chain stay supports on both sides of the aperture, two chain stays having front ends fixed to a mid portion of the main frame and mid portions abutting against the chain stay supports of the metal fitting, and rear forks connecting rear ends of the chain stays and an upper end of the seat tube. Two lateral expanded portions of the cross-shaped lower end are pierced to form apertures into which commercially available bearings are press-fitted to form a hanger portion or bottom bracket of the seat tube.

Production processes are simplified to improve the productivity of bicycles. Increased strength of the frame makes it possible to use thinner tubes for the frame to reduce the entire frame weight and hence cost.

4 Claims, 10 Drawing Figures

FIG_1 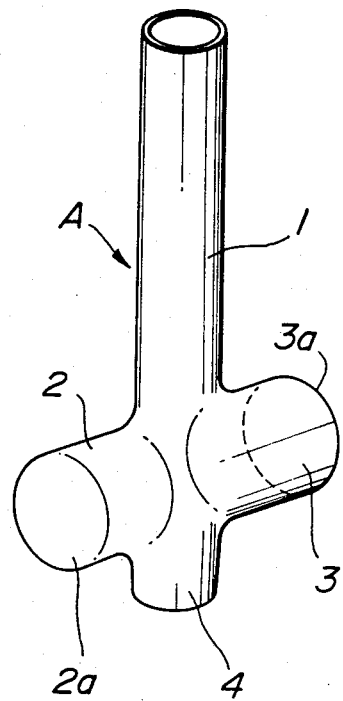
FIG_2 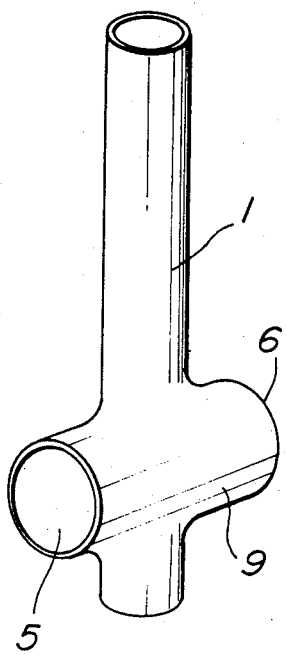
FIG_3 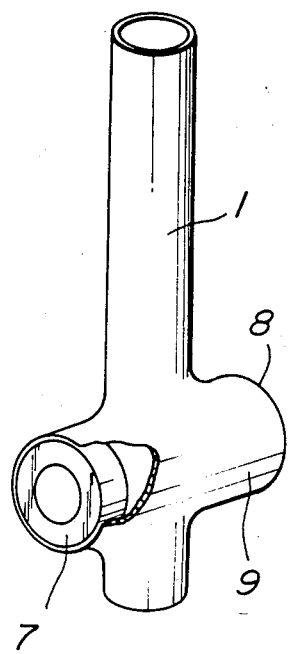

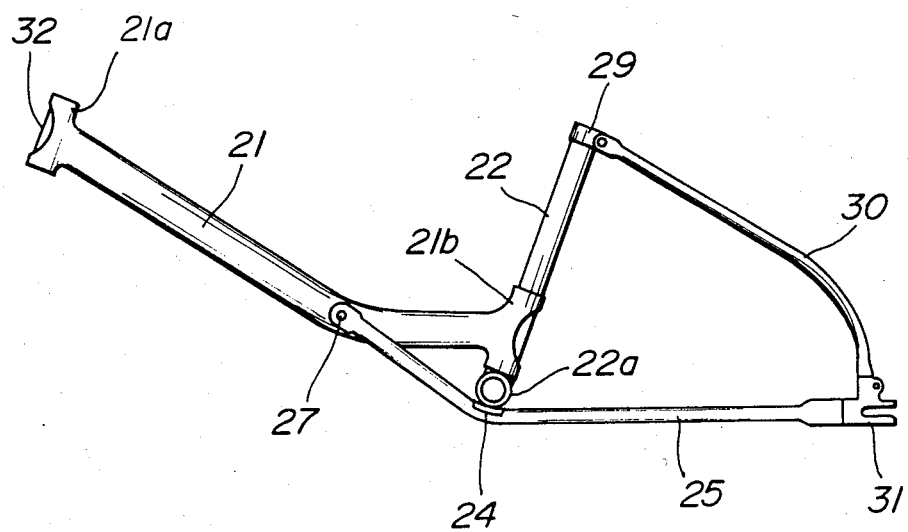
FIG_5

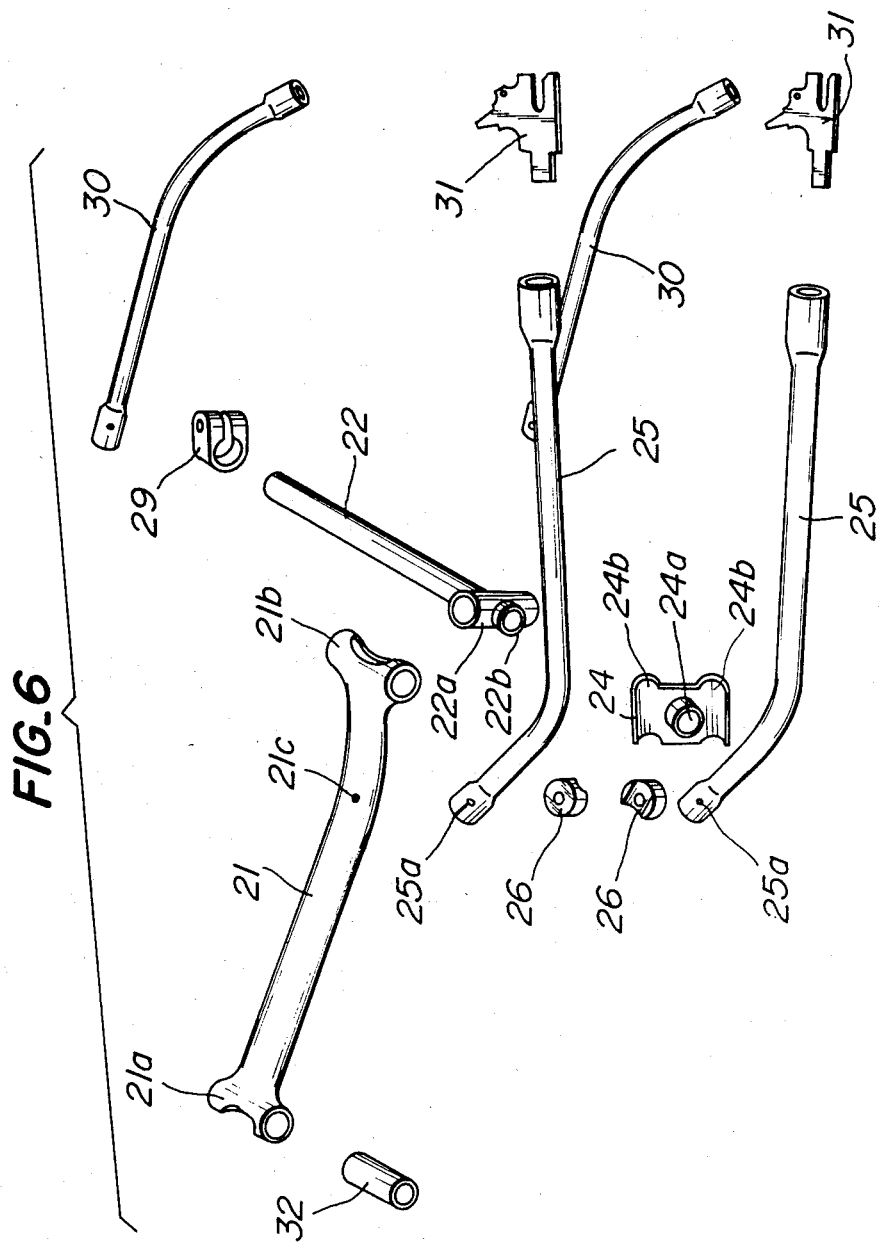

FIG_7
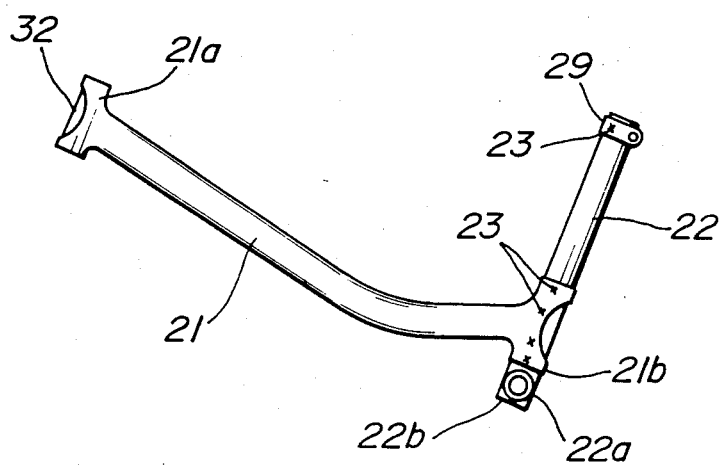
FIG_8
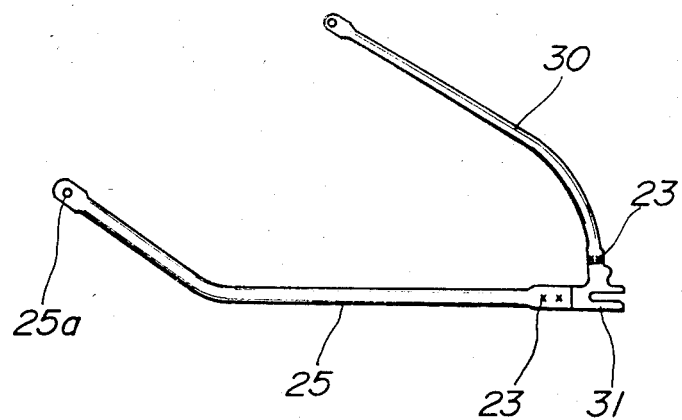

BICYCLE FRAME

BACKGROUND OF THE INVENTION

1. Field of the Invention

This invention relates to a frame for a bicycle including a single main frame, a seat tube, two chain stays and rear forks, and particularly to a seat tube frame consisting of a seat tube and a hanger portion or bottom bracket integral with the seat tube.

2. Description of the Prior Art

With hitherto used bicycles, seat tubes and hanger portions or bottom brackets have been separately made in separate parts. After the seat tube and the bottom bracket have been integrally combined as by welding, the bottom bracket is formed in its inner surface with screw-threads with which a cup and a retainer are provided. Such a production process is, therefore, complicated and thus increases production cost.

With the prior art bicycles, moreover, there have been a great number of parts of bicycle frames. Furthermore, the parts have been combined by welding or wrapping casting (joining a member to a cast article wrapping thereabout in casting), which makes the production process complicated and thus lower the production output. What was worse still, heating by welding adversely affects the strength of the frame.

SUMMARY OF THE INVENTION

It is an object of the invention to provide an improved bicycle frame which simplifies its production process avoiding thermal weak spots thereby eliminating the disadvantages of the prior art.

It is another object of the invention to provide a seat tube for a bicycle, which made of a single blank tube integrally provided with a hanger portion or bottom bracket into which commercially available bearings are inserted to simplify the production process of the seat tube and hence lower the production cost.

In order to achieve the above objects, the bicycle frame according to the invention comprises a main frame including a head tube portion and a seat tube support portion integrally formed of a single blank tube, a seat tube inserted in said seat tube support portion of said main frame from its lower end and having a cross-shaped lower end formed from a single blank tube by bulge-forming, two lateral expanded portions of said cross-shaped lower end being used as a bottom bracket, a metal fitting having an aperture for fitting therein a lower expanded portion of said cross-shaped lower end of said seat tube and chain stay supports on both sides of said aperture, two chain stays having respective front ends abutting against and fixed to a mid portion of said main frame and respective mid portions abutting against said chain stay supports of said metal fitting, and rear forks connecting rear ends of said chain stays and an upper end of said seat tube.

The invention will be more fully understood by referring to the following detailed specification and claims taken in connection with the appended drawings.

BRIEF DESCRIPTION OF THE DRAWINGS

FIG. 1 is a perspective view of a seat tube illustrating the way of manufacturing according to the invention;

FIG. 2 is a perspective view of the seat tube whose two lateral expanded portions are pierced according to the invention;

FIG. 3 is a perspective view of the seat tube provided with bearings inserted in the pierced expanded portions;

FIG. 5 is a side view of an entire bicycle frame according to the invention;

FIG. 6 is an exploded perspective view of the bicycle frame shown in FIG. 5;

FIG. 7 shows a front part of the bicycle frame shown in FIG. 5;

FIG. 8 shows a rear part of the bicycle frame shown in FIG. 5;

DETAILED DESCRIPTION OF THE PREFERRED EMBODIMENT

Figure 4:
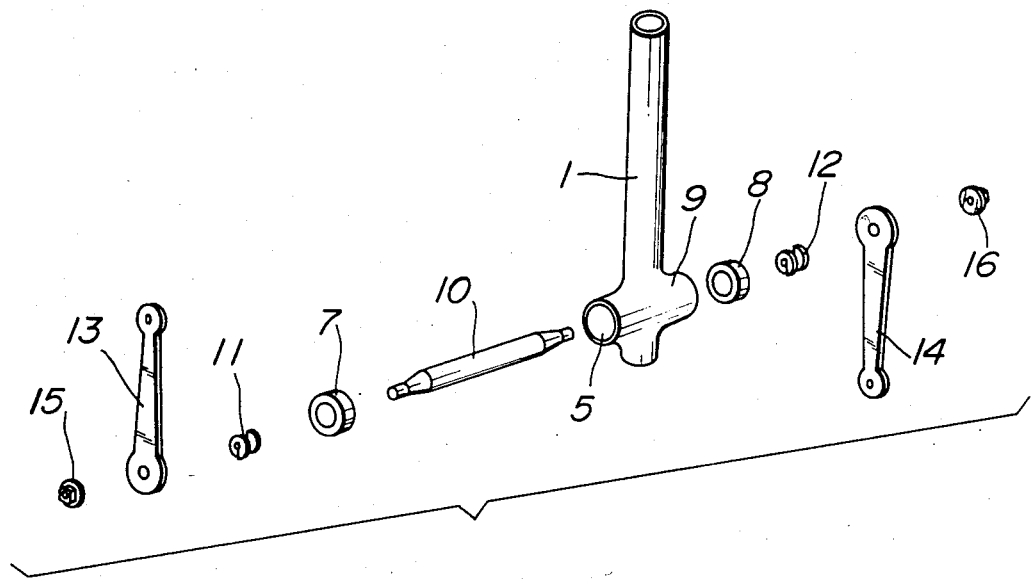
FIG. 4 is an exploded perspective view of parts to be incorporated in the seat tube according to the invention.

The words "front" and "rear" used in the specification and claims mean front and rear sides as viewed from a cyclist riding on a bicycle.

Referring to FIG. 1, a blank tube A consisting of a tube 1 having two lateral expanded portions 2 and 3 at its one end formed by bulge-forming to be used for a seat tube. End plates 2a and 3a of the expanded portions 2 and 3 are pierced or cut off to form apertures 5 and 6 as shown in FIG. 2. Prefabricated or commercially available bearings 7 and 8 are respectively press-fitted in the apertures 5 and 6 to form a hanger portion or bottom bracket 9 integral with the seat tube 1 as shown in FIG. 3. A reference numeral 4 denotes an urging end in the bulge-forming. It is preferable for the above bulge-forming to use the method of forming frame tubes for two-wheeled vehicles developed by the applicant (Japanese Patent Application No. 39,007/80, Japanese Laid-open Patent Application No. 56-136,245). It is also preferable for the blank tubes A to utilize the frame blank tubes for two-wheeled vehicles (Japanese Patent Application No. 177,037/81).

FIG. 4 illustrates respective members to be mounted onto the seat tube for a bicycle constructed as above described according to the invention, such as a crankshaft 10, spring washers 11 and 12, crank arms 13 and 14 and washer-based nuts 15 and 16.

FIG. 5 illustrates one example of a bicycle frame using the seat tube as above described. A single blank tube is formed by bulge-forming with a head tube portion 21a and a seat tube support portion 21b integral therewith to form a main frame 21. In forming the main frame 21, it is preferable to use the method of forming frame tubes for two-wheeled vehicles developed by the applicant (Japanese Patent Application No. 39,007/80, Japanese Laid-open Patent Application No. 56-136,245) and to utilize the blank tubes for two-wheeled vehicles developed by the applicant (Japanese Patent Application No. 177,037/81).

In the same manner as in making the seat tube 1, the seat tube 22 is made from a single blank tube formed at its lower end with a cross-shaped portion by bulge-forming. This is also in the same manner as is used in forming the main frame 21. Horizontal extensions of the cross-shaped portion are further finished into a hanger portion or bottom bracket 22a to form the lower part of the seat tube 22. The seat tube 22 is inserted into the seat tube support portion 21b of the main frame 21 from its lower end and they are fixed with each other by spot welding at 23 as shown in FIG. 7.

Figure 9:
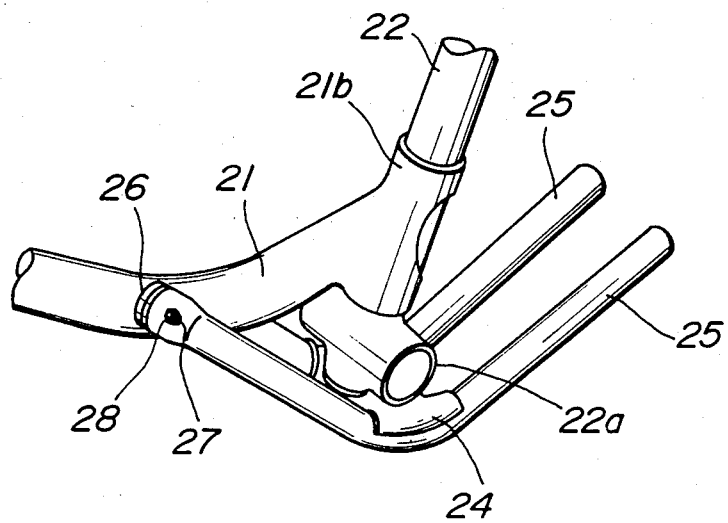
FIG. 9 is a perspective view of a hanger portion or bottom bracket of the bicycle frame shown in FIG. 5 as viewed from the top.
Figure 10:
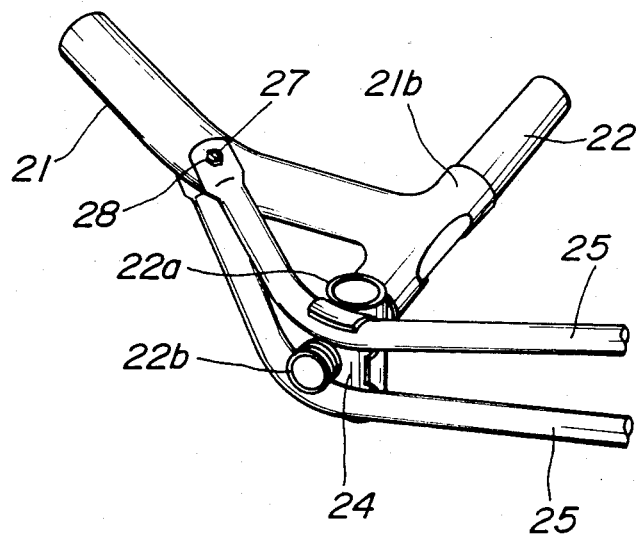
FIG. 10 is a perspective view of the bottom bracket shown in FIG. 5 as viewed from the bottom.

A metal plate is formed into a metal fitting 24 having an aperture 24a encircled by a collar adapted to be fitted within a lower end 22b of the seat tube 22 and chain stay supports 24b, each having a semicircular cross-section, lie on both sides of the aperture 24a. The lower end 22b of the seat tube 22 is fitted within the aperture 24a of the metal fitting 24 to combine it with the seat tube 22 as shown in FIGS. 9 and 10. Two chain stays 25 are formed at their front ends with bolt passing-through apertures 25a. Similarily the main frame 21 is formed at its mid portion with a bolt passing-through aperture 21c. Washers 26 are arranged one on each side of the aperture 21c of the main frame 21 and then the thus arranged washers 26 are embraced by the apertured front ends of the chain stays 25. A bolt 27 is passed through the aligned apertures 25a and 21c and tightened by a nut 28 to connect the main frame 21 and the chain stays 25. The chain stay supports 24b of the metal fitting 24 are located on mid portions of the chain stays 25 to determine a distance therebetween. Two rear forks 30 are connected at their upper ends with an upper end of the seat tube 22 through an annular band or collar 29 and at their lower ends with rear ends of the chain stays 25 by means of a connecting member 31. An inner tube 32 shown in FIG. 6 is inserted into the head tube portion 21a of the main frame 21 as shown in FIGS. 5 and 7.

The seat tube and frame for a bicycle according to the invention constructed as above described have the following effects.

(1) The seat tube having the hanger portion or bottom bracket integral therewith is made of a single tube by cold-forming. Accordingly, the strength of connection between the seat tube and hanger portion or bottom bracket is much higher than that of connections by welding and the like of the prior art.

(2) Production steps for the seat tube are simplified because the welding process as in the prior art is not needed.

(3) The prefabricated bearings are press-fitted into lower end of the seat tube to serve as a combination of cups and retainers, so that screw-thread cutting processes can be omitted to reduce the production cost.

(4) Dimensional accuracy between the seat tube and the hanger portion or bottom bracket is improved.

(5) The front half of the frame is produced only by inserting the seat tube 22 into the main frame and spot welding them. Accordingly, the connection of them is simplified to improve the productivity to a great extent.

(6) The rear half of the frame is produced only by bolting the chain stays 25 and rear forks 30 to the front half of the frame. Accordingly, the assembling is simplified to improve the productivity remarkably. In other words, the bicycle frame according to the invention can be assembled only by spot welding and bolting.

(7) The triangular construction formed by the rear portion of the main frame 21, the lower portion of the seat tube 22 and the front portions of the chain stays 25 is very strong in construction. Accordingly, the frame according to the invention is a high strength frame as a whole.

(8) The increased constructional strength of the seat tube and the frame makes it possible to use thinner tubes for them to reduce the number of parts and hence the entire frame weight.

(9) Although the lower end 22b of the seat tube 22 is an expanded end formed in bulge-forming the hanger portion or bottom bracket 22a, the lower end 22b serves to fit in the metal fitting 24 for supporting the chain stays 25, so that any trimming after bulge-forming is not needed.

(10) The rear half of the frame can be secured to the front half of the frame in a production step after the rear and front halves have been coated with paint or plated, and therefore it is possible to employ a new design applying two-tone color or particular plating.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A bicycle frame comprising a main frame including a head tube portion and an integral seat tube support portion formed of a single blank tube, a seat tube inserted in said seat tube support portion of said main frame from its lower end, said seat tube having an integral cross-shaped lower end formed from a single blank tube by bulge-forming, two lateral expanded portions of said cross-shaped lower end being formed as a bottom bracket, a metal fitting having means for connecting to a lower expanded portion of said cross-shaped lower end of said seat tube and chain stay supports on each side of said connecting means, two chain stays having respective front ends abutting against and fixed to a mid portion of said main frame and respective mid portions abutting against said chain stay supports of said metal fitting, and rear forks connecting rear ends of said chain stays to the upper end of said seat tube.

2. A bicycle frame as set forth in claim 1, wherein said two lateral expanded portions of said seat tube are pierced to form apertures and commercially available bearings press-fitted into said apertures.

3. A bicycle frame as set forth in claim 1, wherein said seat tube is fixed to said seat tube support portion of the main frame by spot welding.

4. A bicycle frame as set forth in claim 1, wherein said connecting means of said metal fitting is a collar and said chain stay supports are formed in a semicircular cross-section to meet an outer diameter of said mid portions of said chain stays.

* * * * *